(No Model.)

F. E. BORTREE.
CARRIAGE SPRING.

No. 349,298.                    Patented Sept. 21, 1886.

UNITED STATES PATENT OFFICE.

FRANCIS EUGENE BORTREE, OF LEDGE DALE, PENNSYLVANIA.

CARRIAGE-SPRING.

SPECIFICATION forming part of Letters Patent No. 349,298, dated September 21, 1886.

Application filed December 29, 1884. Renewed February 19, 1886. Serial No. 192,506. (No model.)

*To all whom it may concern:*

Be it known that I, FRANCIS EUGENE BORTREE, of Ledge Dale, in the county of Wayne, State of Pennsylvania, have invented certain new and useful Improvements in Compound or Combined Buggy-Springs, of which the following is a clear, full, and exact description.

My invention relates to an improvement in buggy-springs; and it consists in the improved construction and combinations of parts hereinafter fully described and claimed, whereby a simple, light, cheap, and durable spring is provided, and one that will form the connections or reach between the axles.

Figure 1:
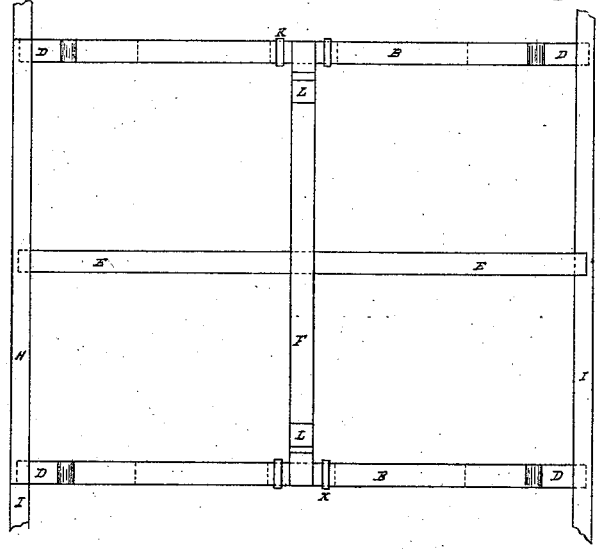
Figure 2:
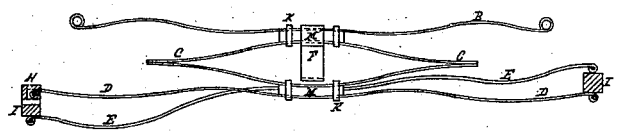
Figure 3:
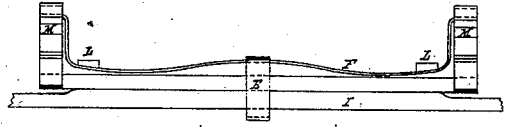

In the drawings, Figure 1 is a plan view of my improved spring applied to the axles of a vehicle, the body being removed. Fig. 2 is a side elevation, and Fig. 3 is a sectional elevation, of Fig. 1.

In the accompanying drawings, in which like letters of reference indicate corresponding parts in all the figures, I I represent the front and rear axles of a vehicle, and upon the front axle is located a head-block, H, which is formed with recesses, as shown.

D D represent springs, which are slightly curved, as shown, and secured at one end to the under side of the rear axle, and at their other ends to the head-block H on the forward or front axle.

E E represent springs, which are secured upon the under sides of the forward axle at one end and upon the upper side of the rear axle at their other ends. Midway between the ends of the springs D and E are blocks M, which are located between the said springs, and are secured thereto by clips K.

C C represent elliptic or bow springs, which are secured upon the upper sides of the blocks M by the clips K.

B B represent springs arranged upon the upper sides of the elliptic or bow springs C C, and between said springs C C and B B are arranged blocks M', and securing the springs and blocks together are clips K', the cross-bars of the body of the buggy (not shown) being attached to the ends of the springs B B.

Secured to and connecting the springs B B and the upper portions or sections of the elliptic springs C is a cross-bar, F, which is bent downwardly, as shown, so that it is on a line, or nearly so, with the lower portions or sections of springs C.

Upon the upper sides of the cross-bar F, adjacent to the ends thereof, are placed elastic cushions L, preferably of rubber, and extending downwardly from the under sides of the body (not shown) are rods or bolts, (not shown,) which are adapted to bear against said rubber cushions when a very heavy load is being carried, thus serving as stops, and preventing the springs from being strained or broken. By securing the springs D E in the manner shown and described a segment of a circle is formed, thus keeping the body from rocking backward and forward. The springs D E, which are shown as slightly curved, form the reach, which, however, allows but slight vertical movement, consequently holding the axles in their proper relative positions, and keeping the wheels in a direct line.

The springs before described are simple in their construction, easily applied, and strong and durable.

Having fully described my invention, what I claim as new, and desire to secure by Letters Patent, is—

1. The combination, with the axles, of longitudinally-disposed springs connecting the same, bow-springs C, springs B, arranged upon the upper sides of the same, and the bar F, as set forth.

2. The combination, with the axles, of longitudinally-disposed springs connecting the same, bow-springs, arranged as shown, springs B on the upper sides thereof, a cross-bar, and rubber cushions on the upper sides of the same, as set forth.

3. The combination, with the axles, of springs connecting the same, blocks interposed between said springs and secured thereto, bow-springs, arranged as shown, springs B on the upper sides of the bow-springs, and a cross-bar having elastic cushions, as set forth.

4. The combination, with the axles, of the springs D E, the springs D being secured to the head-block of the forward axle at one end and to the under side of the rear axle at their other ends, and the springs E to the under side of the forward axle and the upper side of the rear axle at their ends, bow-springs, arranged as shown, springs B on the upper sides thereof, a cross-bar connecting springs B, and elastic cushions on said cross-bar, as set forth.

Witnesses:     FRANCIS EUGENE BORTREE.

JOHN S. BORTREE,
WILLIAM H. SURPLICE.